United States Patent [19]

Motonami et al.

[11] Patent Number: 4,631,865
[45] Date of Patent: Dec. 30, 1986

[54] CONSTRUCTION OF DOOR IN MOTOR VEHICLE

[75] Inventors: Masanao Motonami, Toyota; Eiji Hiramatsu, Nukata; Daiichi Shiraishi, Seto, all of Japan

[73] Assignee: Toyoda Jidosha Kabushiki Kaisha, Japan

[21] Appl. No.: 550,045

[22] Filed: Nov. 9, 1983

[30] Foreign Application Priority Data

Nov. 11, 1982 [JP] Japan .................. 57-198034
Jan. 14, 1983 [JP] Japan .................. 58-4821

[51] Int. Cl.⁴ ............................... E05F 11/38
[52] U.S. Cl. ............................ 49/374; 49/440
[58] Field of Search ........... 49/374, 375, 502, 227, 49/440

[56] References Cited

U.S. PATENT DOCUMENTS

| | | | |
|---|---|---|---|
| 2,024,773 | 12/1935 | Lohrman ........................... | 296/48 |
| 4,240,227 | 12/1980 | Hasler et al. ..................... | 49/374 X |
| 4,483,100 | 11/1984 | Blankenburg et al. ........... | 49/374 X |
| 4,490,942 | 1/1985 | Arnheim et al. ................. | 49/374 |
| 4,494,337 | 1/1985 | Watanabe et al. ............... | 49/374 |

FOREIGN PATENT DOCUMENTS 158321  4/1981  Japan .

Primary Examiner—Kenneth Downey
Attorney, Agent, or Firm—Finnegan, Henderson, Farabow, Garrett & Dunner

[57] ABSTRACT

A window assembly for a motor vehicle door wherein the outer surface of the window and the outer surface of the door frame are substantially flush with each other. The assembly includes a window pane with at least one bracket secured to the outer surface of an end of the pane and projecting outwardly from that end in a direction substantially parallel to the surface of the glass. The assembly also includes a door frame having a vertically positioned guide portion with a guide groove open in the direction of the window pane. A slide piece is secured to the end of the bracket opposite the end secured to the pane and is slidably engaged within the guide groove so that the outer surface of the guide portion is substantially flush with the window pane and the window pane is guided in the vertical direction. Finally, there is a weather strip between the window pane and the door frame which is positioned at the vehicle compartment side of the guide portion.

25 Claims, 10 Drawing Figures

CONSTRUCTION OF DOOR IN MOTOR VEHICLE

BACKGROUND OF THE INVENTION

1. Field of the Invention

This invention relates to construction of a door in a motor vehicle, and more particularly to improvements in construction of a door in a motor vehicle, wherein the outer surface of a door glass and the outer surface of a door frame are substantially flush with each other.

2. Description of the Prior Art

As a means for reducing the air resistance and the wind breaking sounds during running and improving the appearance, there has been proposed a so-called flush-surfaced motor vehicle, wherein the outer surface of the vehicle body is flushed up.

As one problem in the case of the outer surface of the vehicle body being flushed up, there is a difference in stage between a door frame and a door glass.

More specifically, the door glass is expanded out due to a difference in pressure between the interior and the exterior of a compartment during running of the motor vehicle at high speed. However, in order to regulate this, it becomes necessary to provide a guide for pressing the outer peripheral portion of the door glass from outside. In consequence, the outer surface of the guide and the outer surface of the door glass should necessarily have a difference in stage therebetween.

In order to obviate the above-described disadvantage, as described in the specification of U.S. Pat. No. 2,024,773 for example, there has been made a proposal in which substantially a crank-shaped flange is coupled to an end edge of the door glass, and an end portion of this crank-shaped flange is guided in the vertical direction by a guide having a U-shaped cross-section, whereby the center of the guide is offset from the door glass toward the interior of the vehicle body to thereby flush the outer surface of the door frame with the outer surface of the door glass.

However, the above-described construction of the guide providing the flange at the end edge of the door glass presents such a disadvantage that the sliding resistance becomes high in value when the door glass is moved in the vertical direction to be opened.

Further, as described in Japanese Utility Model Kokai (Laid-Open) No. 158321/81 for example, there has been made a proposal in which a flange secured to the door glass is guided by a vertical guide having elasticity in the thickness-wise direction of the door glass and additionally functioning as a door weather strip, to thereby decrease the sliding resistance when the door glass is opened or closed.

However, the construction of the door of the type described presents such disadvantages that a difference in stage occurs at a connecting portion between the top end of the door glass and a roof side portion, whereby it becomes difficult to effect the sealing and the door frame is increased in its width.

To obviate the above-described disadvantages, as described in West German Patent Application No. 2809721 (Refer to FIGS. 1 and 2) for example, there has been made a proposal in which a guide groove 4 integral with a door frame 3 is formed on the side of a compartment 2 at an end portion of a door glass 1 in a motor vehicle M, and a slide piece 5 secured to the rear surface of the end portion of the door glass 1 (on the side of the compartment 2) is projected and engaged with the guide groove 4 in a manner to be slidable in the vertical direction, whereby the sliding resistance is reduced when the door glass 1 is opened or closed without the width of the door frame at the outer peripheral portion of the door glass 1 being increased.

In this case, the sealing between the door glass 1 and the door frame 3 is effected by a door glass weather strip 6 being in contact with a corner portion of the end edge 1A of the door glass 1, and the outer surface 6A of this door glass weather strip 6 and the outer surface 3A of the door frame 3 disposed on the side of the outer periphery of this door glass weather strip 6 are made substantially flush with the outer surface of the door glass 1.

The construction of the door shown in FIG. 2 presents such a disadvantage that, since the door glass weather strip 6 is interposed between the slide piece 5 and the door frame 3, the door glass weather strip 6 is very small in its size in the direction of the width of door, whereby, even if the end edge 1A of the door glass 1 is slightly shifted in its position, the sealing is not easily secured.

In view of this, if a rear contacting portion 6B of the door glass weather strip 6, which is contact with the rear surface of the door glass 1, is increased in its width, then the positions of the slide piece 5 and the guide groove 4 must be moved to the left in FIG. 2 accordingly, and consequently, such a disadvantage is presented that the door frame is increased in its width.

Further, this construction of the door presents such a disadvantage that, since the slide piece 5 projects from the rear surface of the door glass 1, the guide groove 4 for guiding the slide piece 5 should project into the compartment to a large extent.

Furthermore, as indicated by a two-dot chain line in FIG. 2 for example, when such a construction is adopted that a pillar 7 is not observed from outside due to the presence of the door, an end portion 3B of the door frame 3 must be extended in the longitudinal direction of the vehicle, and hence, in this case also, there is presented the disadvantage that the door frame 3 should become large in its width.

Additionally, there is presented such a disadvantage that, since the slide pieces 5 slide directly in the guide groove 4 of the door frame 3, damages may occur in the door frame 3 due to friction, thus causing the rust.

Further, there is presented such disadvantages that, when a gap between the end edge 1A of the door glass 1 and the outer surface of the door frame 3 is large, the sealing is not easily secured between the interior and the exterior of the compartment 2, the end edge 1A of the door glass 1 and the slide pieces 5 are visible from outside of the vehicle to thereby deteriorate the appearance, and the intrusion of dust and the like into the sliding portion between the door glass 1 and the door frame 3 hampers the smooth vertical movement of the door glass 1.

SUMMARY OF THE INVENTION

It is therefore the primary object of the present invention is to provide construction of a door in a motor vehicle, wherein the width and the value of projection into the compartment of the door frame are reduced while the door frame has a sufficient rigidity and the sealing between the door glass and the door frame is secured.

Another object of the present invention is to provide a construction of the door in a motor vehicle, wherein the width and the value of projection into the compartment of the door frame are reduced while the door frame has a sufficient rigidity, the sealing between the door glass and the door frame is secured and the sliding wear between the slide pieces and the guide groove is decreased.

Further object of the present invention is to provide a construction of the door in a motor vehicle, wherein the sealing between the end edge of the door glass and the door frame is easily secured, the end edges of the door glass and the slide pieces are made invisible to improve the appearance of the vehicle, and the intrusion of dust and the like into the sliding portion between the door glass and the door frame is prevented.

To achieve one of the above-described objects, the present invention contemplates that in the construction of the door in the motor vehicle, wherein the slide pieces secured to the end portions of the door glass are slidable coupled into the guide groove of a guide portion of the door frame to thereby guide the door glass in the vertical direction and the outer surface of the door glass and the outer surface of the door frame are substantially flush with each other, a door glass weather strip for sealing between the door glass and the door frame is provided to the compartment's side from the guide portion.

To achieve one of the above-described objects, the present invention contemplates that in the construction of the door in the motor vehicle, wherein the slide pieces secured to the end portions of the door glass are slidable coupled into the guide groove of a guide portion of the door frame to thereby guide the door glass in the vertical direction and the outer surface of the door glass and the outer surface of the door frame are substantially flush with each other, there are provided a door glass weather strip for sealing between the door glass and the door frame at a position to the compartment's side from the guide portion and a glass run provided in the guide groove in the guide portion, for smoothly, slidably guiding in the inner surface thereof the slide pieces.

To achieve one of the above-described objects, the present invention contemplates that, in the aforesaid construction of the door in the motor vehicle, each of the slide pieces is secured to the forward end of a bracket projecting outwardly from an end portion of the door glass in a direction substantially parallel to the surface of the door glass, each of the guide grooves being open toward the end portion of the door glass and surrounding the slide piece is provided and the outer wall surface of the guide portion is substantially flush with the door glass.

To achieve the above-described objects, the present invention contemplates that, in the aforesaid construction of the door in the motor vehicle, each of the brackets for supporting the slide piece is chamfered at end portions of the outer surface, which are disposed in the vertical direction, whereby the frictional resistance between the slide pieces and the fin portion is decreased during the vertical movement of the door glass without affecting the sealing properties.

To achieve one of the above-described objects, the present invention contemplates that, in the aforesaid construction of the door in the motor vehicle, said door glass weather strip is disposed outwardly of the main body of said door frame and said guide portion is disposed in a direction opposite to said door glass and offset to outside with respect to said door glass weather strip and the main body of said door frame.

To achieve one of the above-described objects, the present invention contemplates that, in the aforesaid construction of the door in the motor vehicle, a portion of the glass run disposed outwardly of the door is extended along the outer surface of the door glass to form a fin portion for sealing the outer surface of the end portion of the door glass, whereby the intrusion of dust and the like into the sliding portion between the door glass and the door frame is prevented, and the end portion of the door glass and the slide piece are made invisible from outside.

To achieve the above-described objects, the present invention contemplates that, in the aforesaid construction of the door in the motor vehicle, the forward end of the fin portion of the glass run in its free condition is opposed to the door glass weather strip, whereby the sealing properties are further improved.

To achieve the above-described objects, the present invention contemplates that, in the aforesaid construction of the door in the motor vehicle, the forward end of the fin portion of the glass run in its free condition is supported on the forward end of the door glass weather strip, so that the sliding portion between the end portion of the door glass and the door frame can be sealed even in the free condition.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE PREFERRED EMBODIMENTS

Figure 1:
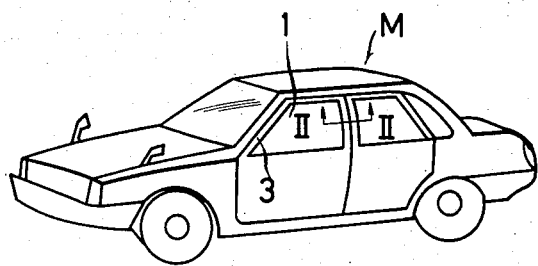
FIG. 1 is a perspective view showing the motor vehicle, to which the present invention is to be applied.
Figure 2:
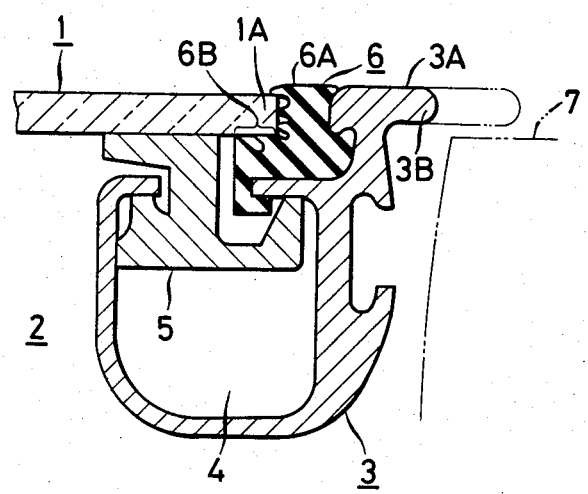
FIG. 2 is a sectional view taken along the line II—II in FIG. 1 showing the construction of the door in the motor vehicle of the prior art.
Figure 3:
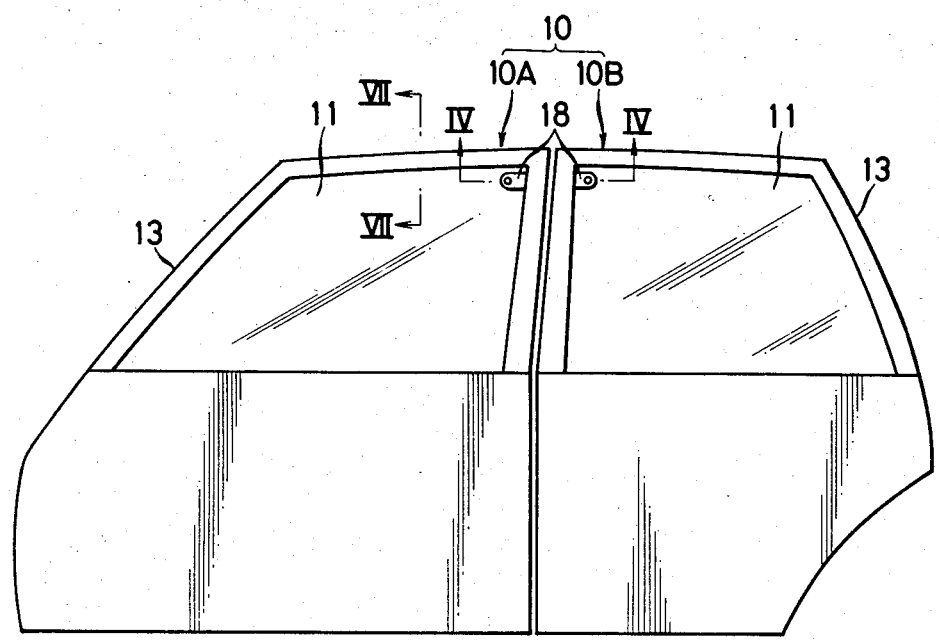
FIG. 3 is a front view showing an embodiment of the construction of the door in the motor vehicle according to the present invention.

Description will hereunder be given of the embodiments of the present invention with reference to the drawings.

As shown in FIGS. 3 through 7, according to this embodiment, in the construction of the door in the motor vehicle, wherein slide pieces 12 secured to an end portion of a door glass 11 of a side door 10 are slidably coupled into a guide groove 15 of a guide portion of a door frame 13 to thereby guide the door glass 11 in the vertical direction and the outer surface of the door glass 11 and the outer surface of the door frame 13 are substantially flush with each other, a door glass weather strip 16 for sealing between the door glass 11 and the door frame 13 is provided at a position to the side of a compartment 17 from the guide portion 14.

The slide piece 12 is secured to the forward end of a bracket 18 projecting outwardly from the end portion of the door glass in a direction substantially parallel to the glass surface, the guide portion 14 is provided with the guide groove 15 being open toward the end portion of the door glass 11 and surrounding the slide piece 12 and the outer wall surface 14A of the guide portion 14 is substantially flush with the outer surface of the door glass 11.

Figure 6:
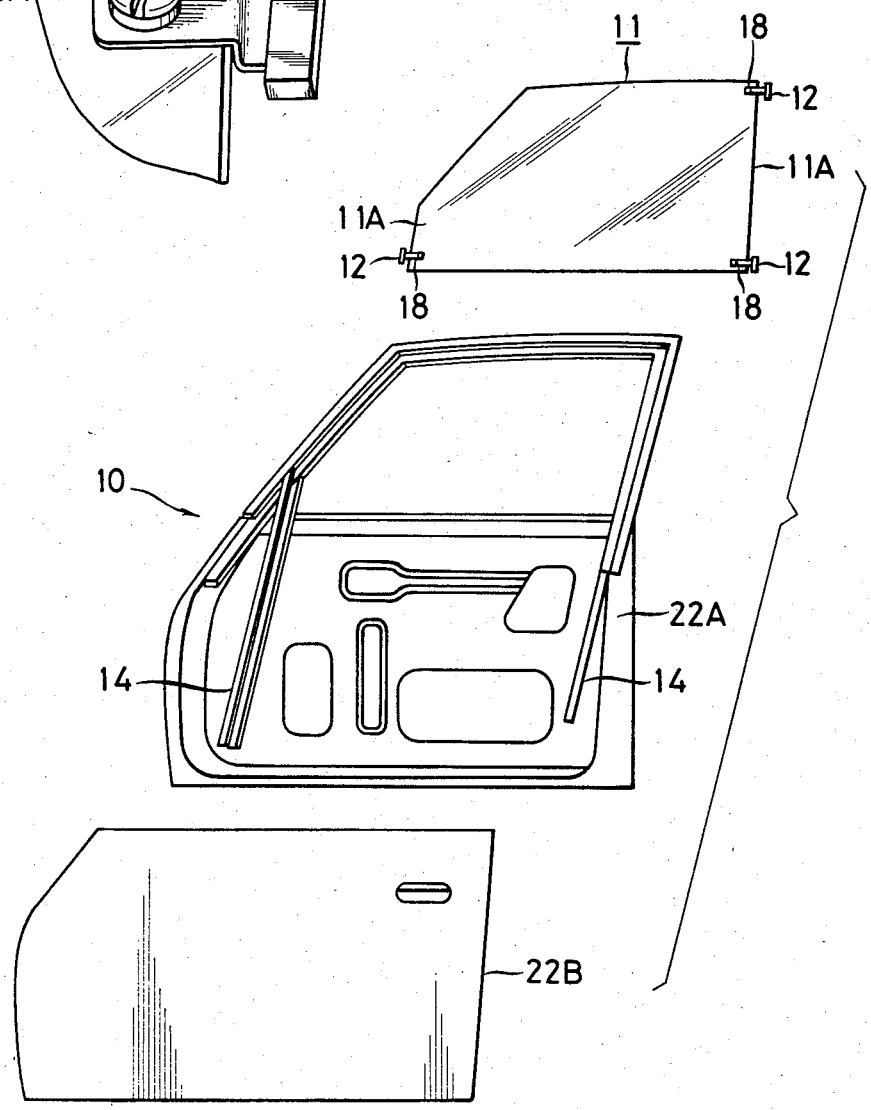
FIG. 6 is a disassembled perspective view of the above embodiment.

As shown in FIG. 6, in a front side door 10A, the slide pieces 12 are formed of synthetic resin members molded to the forward ends of the brackets 18 which are clamped and fixed to the door glass 11 by screws 19A and nuts 19B at the lower forward end portion, the top end of the rear end edge and the bottom end thereof.

Figure 4:
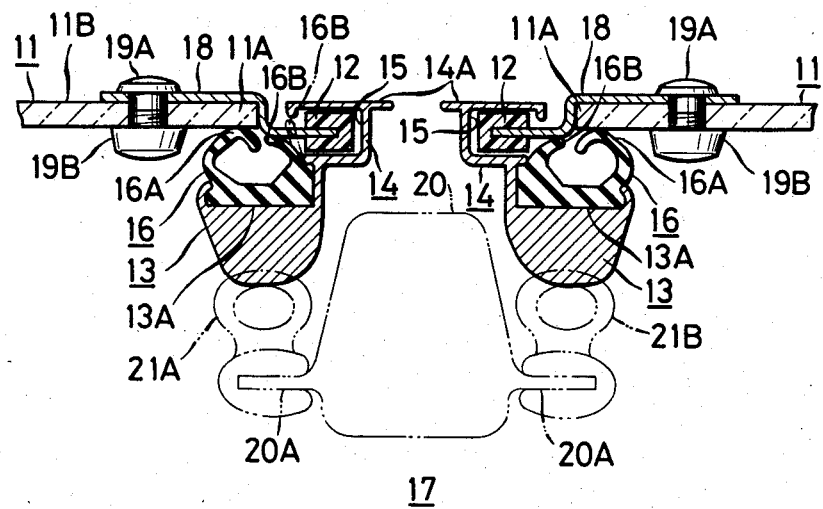
FIG. 4 is an enlarged sectional view taken along the line IV—IV in FIG. 3.
Figure 5:
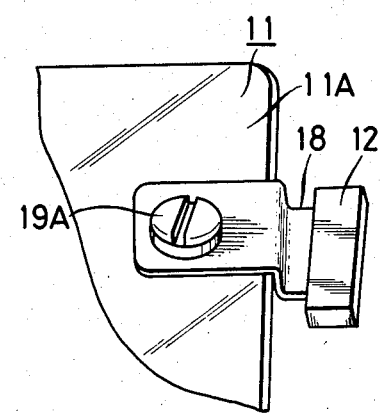
FIG. 5 is a perspective view enlargedly showing the vicinity of the slide piece in the above embodiment.

As shown in FIG. 4, the bracket 18 is formed into a crank shape and consequently the slide piece 12 is offset from the door glass 11 toward the compartment 17, so that the outer wall surface 14A of the guide portion 14 can be substantially flush with the outer surface of the door glass 11.

Furthermore, the door glass weather strip 16 is disposed on the side of the compartment 17 with respect to the door glass 11, supported by an outwardly directed channel portion 13A formed on the door frame 13, one 16A of lips thereof is extending from the compartment 17 and the center of door glass toward the guide groove 15 and constantly in contact with the inner surface of the end edge 11A of the door glass 11, and the other 16B of the lips is adapted to close the guide groove 15 of the guide portion 14 as indicated by two-dot chain lines in FIG. 4 at a portion where the other 16B of the lips does not contact the bracket 18.

In consequence, the guide portion 14 is offset in the direction opposite to the door glass 11 with respect to the door glass weather strip 16 and the main body of the door frame 13.

In FIG. 4, designated at 20 is a center pillar, 21A and 21B door weather strips, respectively.

The center pillar 20 is disposed such that, when the front side door 10A and rear side door 10B are closed, the center pillar is shielded substantially invisibly from outside by the guide portions 14 of the door frames 13 of the both doors. More specifically, the guide portions 14 are offset from the main bodies of the door frames 13 to the extent where the guide portions can shield the center pillar 20. Furthermore, the door weather strips 21A and 21B are secured to a flange portion 20A of the center pillar 20 and adapted to be in contact with the front side door 10A and rear side door 10B at the rear surfaces of the outwardly directed channel portions 13A of the door frames 13 of the both doors when the both doors are closed.

The guide portion 14 of the door frame 13 is projected into a space formed between a door inner panel 22A and a door outer panel 22B in the same manner as in the conventional construction of the door as shown in FIG. 6.

Figure 7:
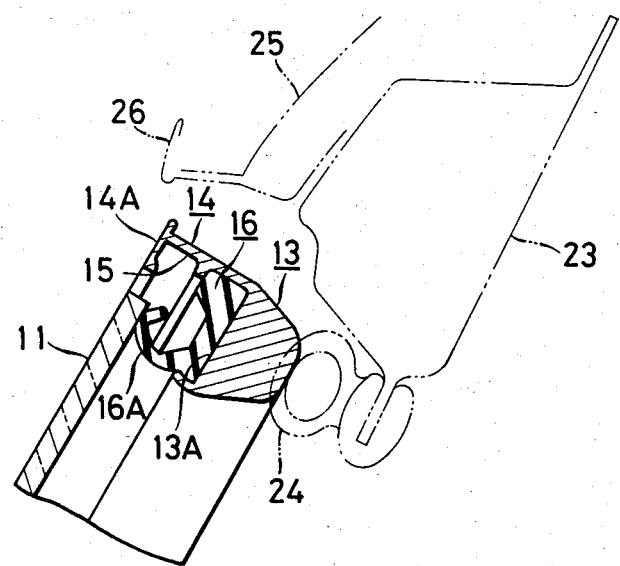
FIG. 7 an enlarged sectional view taken along the line VII—VII in FIG. 3.

Furthermore, a portion of the door frame 13 forming the top part and thereabout is adapted to be in contact with a door weather strip 24 secured to a roof side rail 23 as shown in FIG. 7. In the drawing, designated at 25 is a roof ano 26 a drip channel, respectively.

In this case, the lip 16B of the door glass weather strip 16 on the side of the guide portion 14 is omitted because the lip may interfere with the slide piece 16 when the door glass 11 is fully closed.

In this embodiment, the door glass weather strip 16 is disposed to the side of the compartment 17 from tne guide portion 14 of the door frame 13, whereby the size of the door glass weather strip 16 in the width-wise direction is not restricted by the guide portion 14, so that the scope of contact with the door glass 11 can be increased, thus enabling to secure the sealing without increasing the width of the guide portion 14.

Further, in this embodiment, the guide portion 14 is disposed along the outer periphery of the door glass 11, so that the value of projection of the guide portion into the compartment 17 can be reduced.

Additionally, to make the pillar invisible due to the presence of the portions of the door frames when the doors are closed, in this embodiment, the guide portions 14 are provided along the end edges 11A in front and at the rear of the door glasses 11, so that the guide portions 14 can shield the pillar, thereby enabling to offer an advantage of shielding the pillar without increasing the width of each of the door frames 1.

In the above embodiment, the three slide pieces 12 are secured to the door glass 11 at the forward and rear ends thereof, however, the present invention need not necessarily be limited to this, and, each of slide pieces or four slide pieces, etc. may be secured to the forward and rear ends of the door glass, and the positions of securing the slide pieces may be such that three or more slide pieces are disposed in the vertical direction along the end edge 11A at the rear portion of the door glass 11 in the front side door 10A for example.

However, when the appearance of the side door 10 is considered, it is desirable to provide one slide piece at the end edge of the forward portion and each of slide pieces at the top and bottom of the end edge of the rear portion.

Description will now be given of the second embodiment of the present invention with reference to the drawings.

Figure 8:
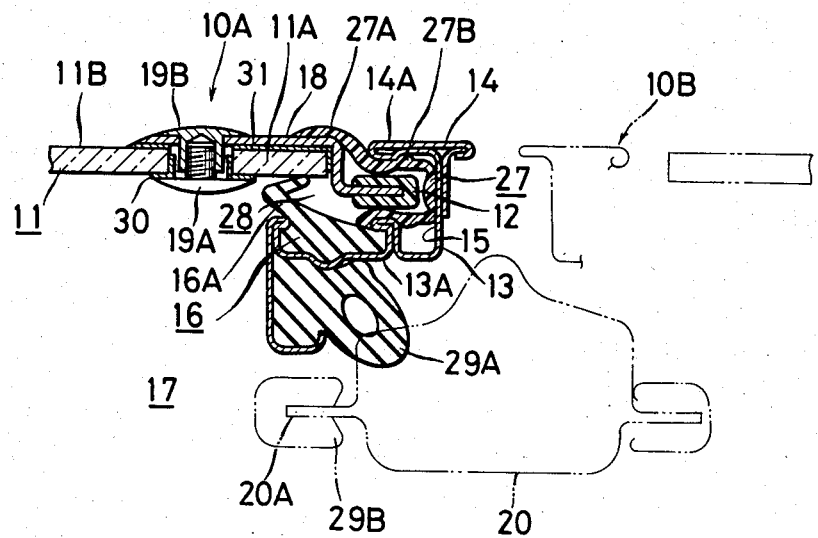
FIG. 8 is a sectional view similar to FIG. 4, showing a second embodiment of the construction of the door in the motor vehicle.
Figure 9:
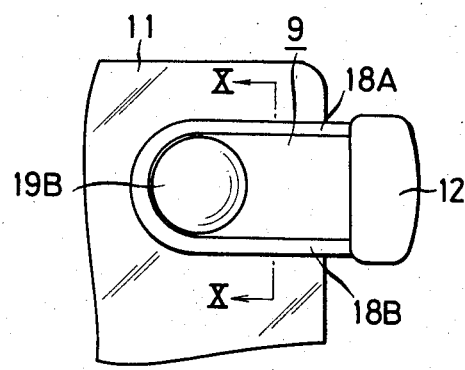
FIG. 9 is a front view enlargedly showing the vicinity of the slide piece in the second embodiment.
Figure 10:
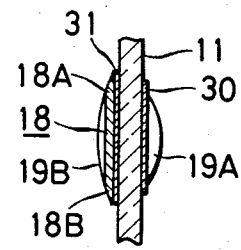
FIG. 10 is a sectional view taken along the line X—X in FIG. 4.

As shown in FIGS. 8 through 10, according to this embodiment, in the construction of the door in the motor vehicle, wherein the slide pieces 12 secured to the end portion 11A of door glass 11 of the front side door 10A are slidably coupled into the guide groove 15 of the guide portion 14 of the guide frame 13 to thereby guide the door glass 11 in the vertical direction and the outer surface of the door glass 11 and the outer surface of the door frame 13 are substantially flush with each other, there are provided the door glass weather strip 16 for sealing between the door glass 11 and the door frame 13 at the position to the side of the compartment 17 from the guide portion 14 and the glass run 27 provided in the guide groove 15 of the guide portion 14 for smoothly, slidably guiding in the inner surface thereof the slide pieces 12.

The glass run 27 is made of hard and flexible resin or the like, formed into substantially a U-shape in cross section disposed along the inner surface of the guide groove 15 of the guide portion 14 and a portion of the glass run 27 disposed outwardly of the door is extended along the outer surface 11B of the door glass 11 to be formed into a fin portion 27A for sealing the outer surface of the end portion 11A of the door glass 11.

The forward end of the fin portion 27A of the glass run 27 in its free condition is opposed to the forward end lip 16A of the door glass weather strip 16 and comes into contact with the outer surface of the door glass 11 at a position outwardly of the lip 16A.

The forward end of the fin portion 27A of the glass run 27 in its free condition is supported by the forward end lip 16A of the door glass weather strip 16 from inside, so that a space 28 formed by the glass run 27 and the door weather strip 16 can be sealed even when the door glass 11 is absent between the fin portion 27A and the door glass weather strip 16.

As shown in FIGS. 9 and 10, the crank-shaped bracket 18 for supporting the slide piece 12 on the door glass 11 is chamfered into tapered surfaces 18A and 18B at end portions of the outer surface, which are disposed in the vertical direction, whereby the frictional resistance between the slide pieces 12 and the fin portion 27A of the glass run 27 is decreased during the vertical movement of the slide pieces together with the door glass 11 in the glass run 27.

In FIG. 8, designated at 27B is a projection integrally formed on the glass run 27 for locking the glass run 27 against dislodging from the guide groove 15, 29A a door weather strip, 29B an opening trim, and 30, 31 fillers, respectively.

The center pillar 20 is disposed such that, when the front side door 10A and rear side 10B are door closed, the center pillar is shielded substantially invisibly from outside by the guide portions 14 of the door frames 13 of the both doors. Furthermore, the door weather strips 29A are secured to the doors 10, and, when the front side door 10A and rear side door 10B are closed, brought into contact with the center pillar 20 at the rear surfaces of the outwardly directed channel portions 13A of the door frames 13.

The arrangements other than the above are identical with those in the first embodiment, and same reference numerals are used to designate same or similar parts, so that detailed description will be omitted.

In this embodiment, the door glass weather strip 16 is disposed to the side of the compartment 17 from the guide portion 14 of the door frame 13, whereby the size of the door glass weather strip 16 in the width-wise direction is not restricted by the guide portion 14, so that the scope of contact with the door glass can be increased, thus enabling to secure the sealing without increasing the width of the guide portion 14.

Furthermore, the slide piece 12 is guided by the guide groove 15 formed in the guide portion 14 of the door frame 13 through the glass run 27, so that the guide groove 15 can be prevented from being damaged and rusting by the sliding due to the vertical movement of the slide piece 12.

Additionally, the outer surface of the end portion 11A of the door glass 11 is constantly covered by the fin portion 27A as being the extension of the glass run 27, so that the intrusion of dust and the like through the gap formed between the end portion 11A of the door glass 11 and the door frame 13 can be prevented. In this case, in this embodiment, the end portions of the outer surface, which are disposed in the vertical direction of the bracket 18 for supporting the slide piece 12 are chamfered into tapered surfaces 18A and 18B, so that the sliding contact between the bracket 18 and the fin portion 27A of the glass run 27 can be smoothly effected.

Further, in this embodiment, the forward end of the fin portion 27A of the glass run 27 in its free condition is opposed to the forward end of the lip 16A of the door glass weather strip 16 and adapted to be supported by the forward end of the lip 16A, so that the inner space 28 formed therebetween can be protected from the intrusion of dust and the like through the contact therebetween not only when the door glass 11 and the bracket 18 pass therethrough but also after the passing.

Further, the fin portion 27A of the glass run 27 is extended to a position where a portion of the bracket 18, the end portion 11A of the door glass 11 and the forward end of the lip 16A and thereabout of the door glass weather strip 16 are shielded, so that the appearance of the motor vehicle from outside can be improved.

Further, in this embodiment, the guide portion 14 is disposed along the outer periphery of the door glass 11, so that the value of projection thereof into the compartment 17 can be reduced.

Additionally, to make the pillar invisible due to the presence of the frame portions of the both doors when the both doors are closed, in this embodiment, the guide portions 14 are provided along the end portions 11A in front and at the rear of the door glasses 11, so that the pillar can be shielded by this guide portion 14, thereby enabling to shield the pillar without increasing the width of the door frame 13.

What is claimed is:

1. A window assembly for a motor vehicle door, comprising:
    a door glass having an end portion and an outer side surface;
    at least one bracket having a first end and a second end, said first end being secured along said outer side surface of said door glass proximate said end portion and said second end projecting outwardly from said end portion in a direction substantially parallel to said outer surface of said door glass;
    a door frame including a main body and a substantially vertically aligned guide portion projecting outwardly from said main body and having a guide groove open in the direction of said door glass;
    at least one slide piece secured to said second end of said bracket and slidably positioned within said guide groove, to retain said outer side surface of said door glass substantially flush with an outer surface of said guide portion while said door glass is guided in the vertical direction along said guide groove;
    a weather strip extending between said door glass and said door frame and positioned along said guide portion proximate the vehicle interior; and
    a glass run mounted within said guide groove for firmly supporting and smoothly guiding said slide piece within said guide groove.

2. The window assembly of claim 1, wherein said bracket is chamfered along said end portion and said outer side surface, which are disposed in the vertical direction.

3. The window assembly of claim 1, wherein said weather strip is disposd outwardly of the main body of said door frame and said guide portion is disposed opposite said door glass and offset to the outside with respect to said weather strip and the main body of said door frame.

4. The window assembly of claim 2, wherein said weather strip is disposed outwardly of the main body of said door frame and said guide portion is disposed opposite said door glass and offset to the outside with respect to said weather strip and the main body of said door frame.

5. The window assembly of claim 2, wherein said weather strip is disposed outwardly of the main body of said door frame and said guide portion is disposed opposite said door glass and offset to the outside with respect to said weather strip and the main body of said door frame.

6. The window assembly of claim 1, wherein a portion of said glass run disposed outwardly from the door is extended along said outer side surface of said door glass to form a fin for sealing said outer side surface of the end portion of said door glass.

7. The window assembly of claim 2, wherein a portion of said glass run disposed outwardly from the door is extended along said outer side surface of said door glass to form a fin for sealing said outer side surface of the end portion of said door glass.

8. The window assembly of claim 5, wherein a portion of said glass run disposed outwardly from the door is extended along said outer side surface of said door glass to form a fin for sealing said outer side surface of the end portion of said door glass.

9. The window assembly of claim 6, wherein the forward end of said fin in its free condition is opposed to said weather strip.

10. The window assembly of claim 7, wherein the forward end of said fin in its free condition is opposed to said weather strip.

11. The window assembly of claim 8, wherein the forward end of said fin in its free condition is opposed to said weather strip.

12. The window assembly of claim 9, wherein the forward end of said fin is supported by the forward end of said weather strip.

13. The window assembly of claim 10, whrein the forward end of said fin is supported by the forward end of said weather strip.

14. The window of claim 11, wherein the forward end of said fin is supported by the forward end of said weather strip.

15. The window assembly of claim 11, wherein the forward end of said fin is supported by the foward end of said weather strip.

16. The window assembly of claim 9, wherein said fin seals said outer side surface of said end portion of said door glass and the outer surface of said slide piece.

17. The window assembly of claim 10, wherein said fin seals said outer side surface proximate said end portion of said door glass and the outer surface of said slide piece.

18. The window assembly of claim 11, wherein said fin seals said outer side surface proximate said end portion of said door glass and the outer surface of said slide piece.

19. The window assembly of claim 11, wherein said fin seals said outer side surface proximate said end portion of said door glass and the outer surface of said slide piece.

20. The window assembly of claim 12, wherein said fin seals said outer side surface proximate said end portion of said door glass and the outer surface of said slide piece.

21. The window assembly of claim 13, wherein said fin seals said outer side surface proximate said end portion of said door glass and the outer surface of said slide piece.

22. The window assembly of claim 14, wherein said fin seals said outer side surface proximate said end portion of said door glass and the outer surface of said slide piece.

23. The window assembly of claim 15, wherein said fin seals said outer side surface proximate said end portion of said door glass and the outer surface of said slide piece.

24. A window assembly for a motor vehicle door, comprising:

a door glass having an end portion and an outer side surface;

at least one bracket having a first end and a second end, said first end being secured along said outer side surface of said door glass proximate said end portion and said second end projecting outwardly from said end portion in a direction substantially parallel to said outer surface of said door glass;

a door frame including a main body and a substantially vertically aligned guide portion projecting outwardly from said main body and having a guide groove open in the direction of said door glass;

at least one slide piece secured to said second end of said bracket and slidably positioned within said guide grooves, to retain said outer side surface of said door glass substantially flush with an outer surface of said guide portion while said door glass is guided in the vertical direction along said guide groove;

a weather strip extending between said door glass and said door frame and positioned along said guide portion proximate the vehicle interior; and sealing means mounted within said guide groove and engaging said outer surface for guiding said door glass and for sealing along said guide groove and said door glass proximate said end portion.

25. The window assembly of claim 25, wherein said sealing means includes a glass run mounted within said guide groove, said glass run having a fin for engaging said door glass.

* * * * *

UNITED STATES PATENT AND TRADEMARK OFFICE
CERTIFICATE OF CORRECTION

PATENT NO. : 4,631,865
DATED : December 30, 1986
INVENTOR(S) : Masanao MOTONAMI, et al.

It is certified that error appears in the above-identified patent and that said Letters Patent is hereby corrected as shown below:

ON THE TITLE PAGE:
    In the assignee information; change

"Toyoda Jidosha Kabushiki Kaisha" to

--Toyota Jidosha Kabushiki Kaisha--

In Claim 13, line 1; change

"whrein" to --wherein--

Signed and Sealed this

Twenty-fourth Day of May, 1988

*Attest:*

DONALD J. QUIGG

*Attesting Officer*      *Commissioner of Patents and Trademarks*